United States Patent
Kaneko

(10) Patent No.: US 10,140,069 B2
(45) Date of Patent: Nov. 27, 2018

(54) PRINTING APPARATUS, METHOD OF CONTROLLING THE SAME, AND STORAGE MEDIUM

(71) Applicant: CANON KABUSHIKI KAISHA, Tokyo (JP)

(72) Inventor: Takayuki Kaneko, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/955,053

(22) Filed: Apr. 17, 2018

(65) Prior Publication Data

US 2018/0307446 A1    Oct. 25, 2018

(30) Foreign Application Priority Data

Apr. 25, 2017   (JP) ................ 2017-086545

(51) Int. Cl.
*G06F 3/12*   (2006.01)
*G06F 21/31*  (2013.01)

(52) U.S. Cl.
CPC .......... *G06F 3/1222* (2013.01); *G06F 3/1204* (2013.01); *G06F 3/1238* (2013.01); *G06F 3/1239* (2013.01); *G06F 3/1255* (2013.01); *G06F 21/31* (2013.01)

(58) Field of Classification Search
CPC ............................. G06F 3/1222; G06F 3/1204
See application file for complete search history.

(56) References Cited

U.S. PATENT DOCUMENTS

| | | | | |
|---|---|---|---|---|
| 2009/0268227 A1* | 10/2009 | Kaneko | ................ | G06F 3/1222 358/1.14 |
| 2010/0302573 A1* | 12/2010 | Hakozaki | .............. | G06F 3/1204 358/1.14 |
| 2013/0254362 A1* | 9/2013 | Iwase | ................. | H04L 63/0218 709/223 |

FOREIGN PATENT DOCUMENTS

| | | |
|---|---|---|
| JP | 2012-014424 A | 1/2012 |
| JP | 5494315 B2 | 5/2014 |
| JP | 2016-025417 A | 2/2016 |
| JP | 2016-118855 A | 6/2016 |

* cited by examiner

*Primary Examiner* — Ibrahim Siddo

(74) *Attorney, Agent, or Firm* — Carter, DeLuca, Farrell & Schmidt, LLP

(57) ABSTRACT

It is determined whether or not first user information included in a received print job includes first character information that is not supported by a user authentication function. If the first user information includes the first character information, the first user information is converted to second user information in which the first character information is changed to second character information supported by the user authentication function. If the second user information does not match user information managed by the user authentication function, the first user information and the second user information are registered to the user authentication function in association with each other. If the second user information matches user information managed by the user authentication function, the first user information and third user information are registered to the user authentication function in association with each other.

9 Claims, 9 Drawing Sheets

F I G. 1
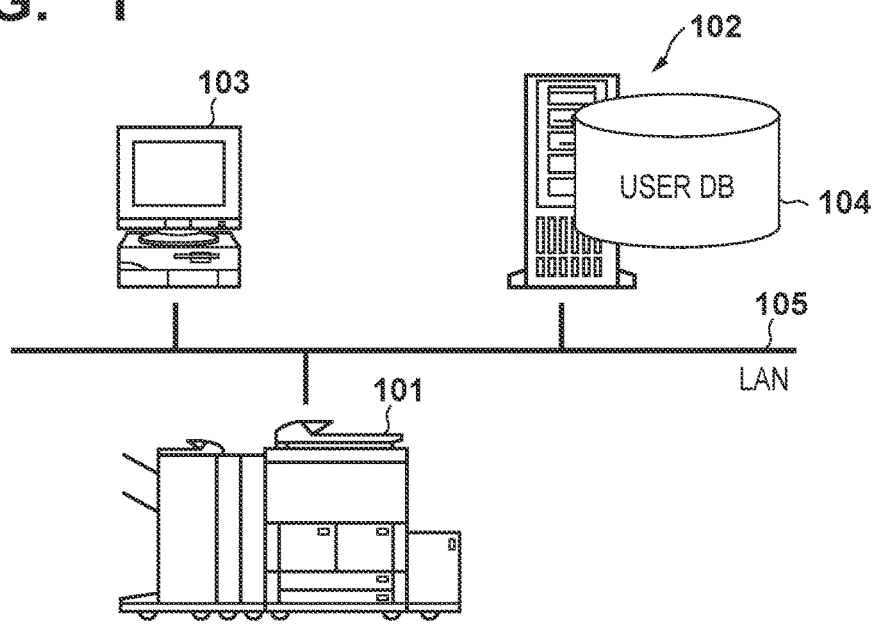
F I G. 2
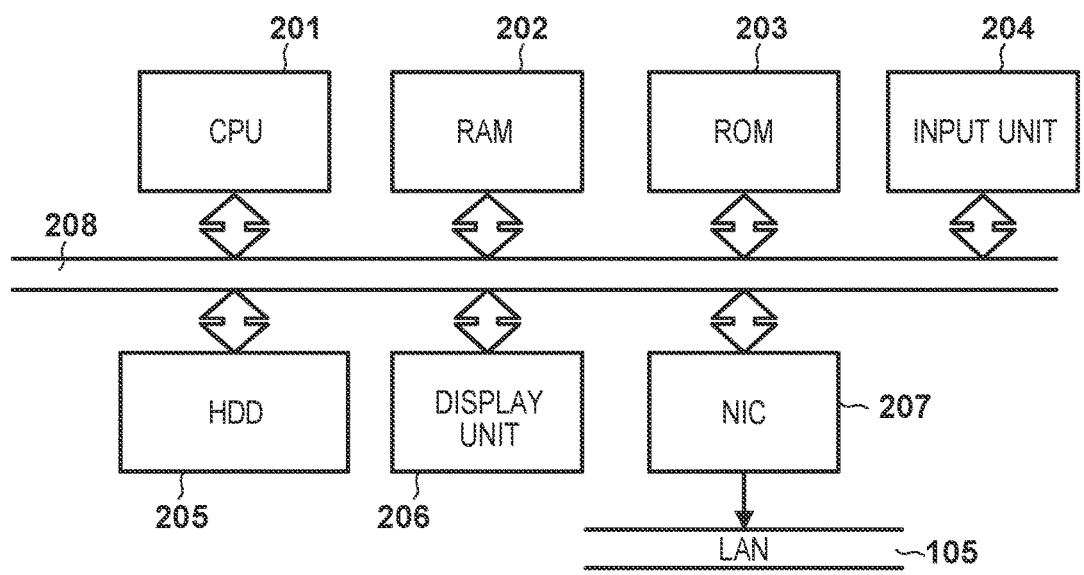

FIG. 7

| USER ID | JOB OWNER NAME |
|---|---|
| Sato_abc | Sato¥abc |
| Sato_abc_2 | Sato@abc |

701 · USER ID
702 · JOB OWNER NAME
703 · Sato_abc / Sato¥abc
704 · Sato_abc_2 / Sato@abc

FIG. 8

USER LIST

LOGIN BY SELECTING BUTTON.
BE SURE TO LOGOUT WHEN OPERATION HAS ENDED.

[ Sato_abc ]   [ Sato_abc_2 ]

FIG. 9

PRINT JOB LIST

| RECEPTION TIME AND DATE | USER ID | PRINT JOB NAME | STORAGE LOCATION |
|---|---|---|---|
| 2012/4/10 9:00 | Sato_abc | AAA.txt | /data/Sato_abc |
| 2012/4/10 9:05 | Sato_abc_2 | BBB.pdf | /data/Sato_abc_2 |
| 2012/4/10 10:00 | Sato_abc | CCC.doc | /data/Sato_abc |
| 2012/4/10 10:00 | Sato_abc | DDD.doc | /data/Sato_abc |
| 2012/4/10 11:00 | Sato_abc_2 | EEE.doc | /data/Sato_abc_2 |
| 2012/4/10 12:00 | Sato_abc_2 | FFF.doc | /data/Sato_abc_2 |

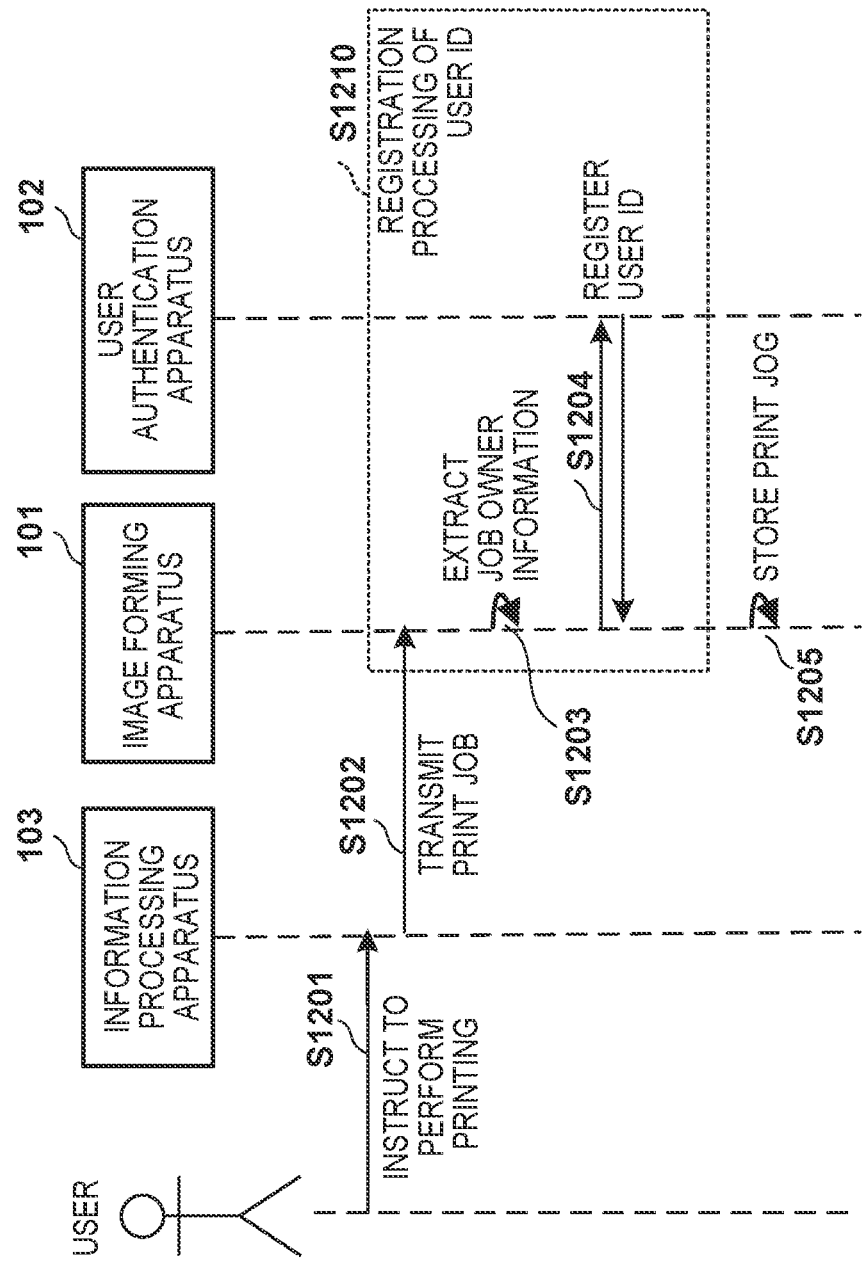

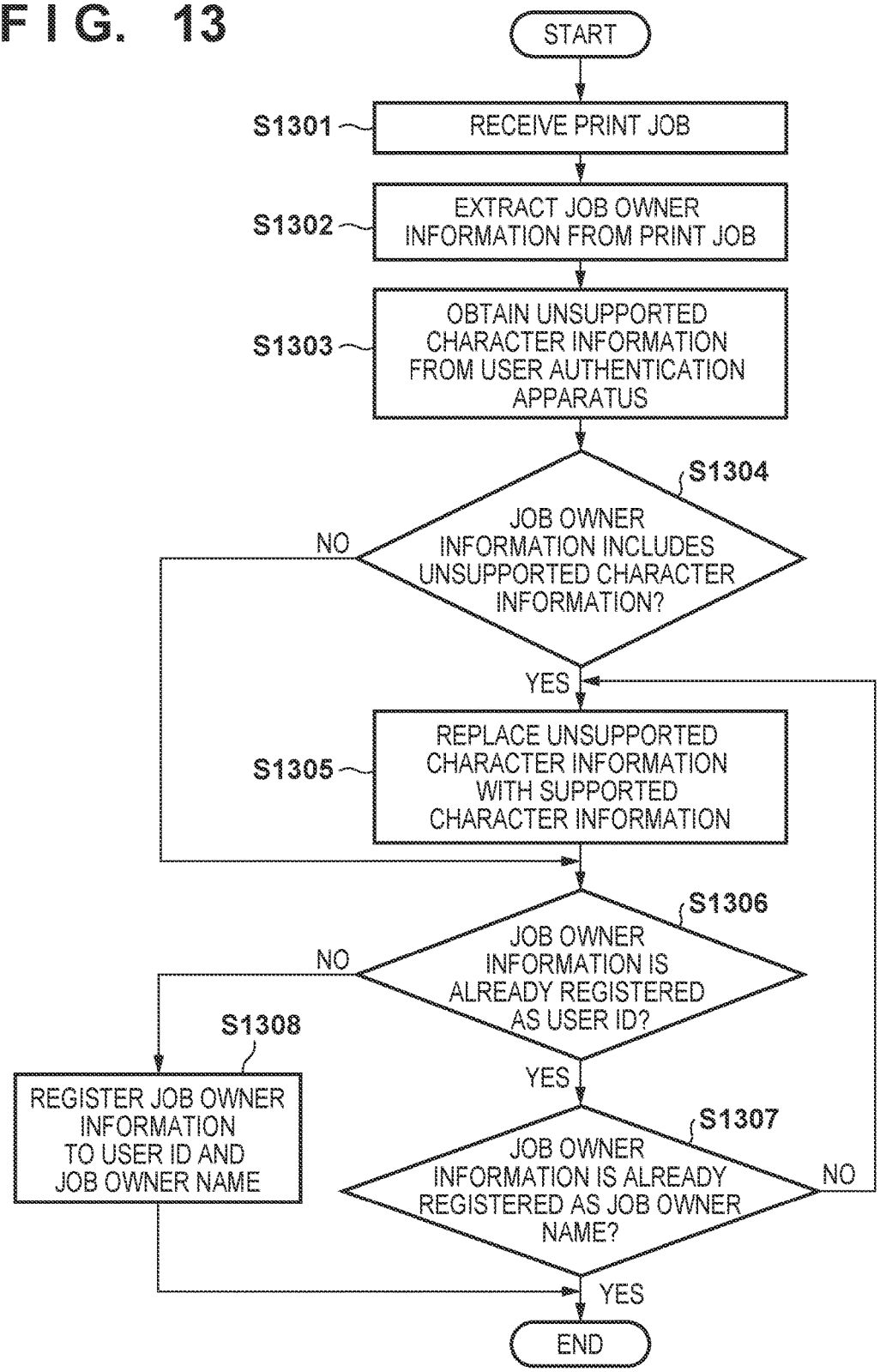

PRINTING APPARATUS, METHOD OF CONTROLLING THE SAME, AND STORAGE MEDIUM

BACKGROUND OF THE INVENTION

Field of the Invention

The present invention relates to a printing apparatus, a method of controlling the printing apparatus, and a storage medium.

Description of the Related Art

A storing printing function is known in which a print job received from a PC is stored in a storage apparatus in a printing apparatus in order to prevent a printed item that was printed by the printing apparatus from being left in the printing apparatus. With this storing printing function, a user moves to a place where the printing apparatus is located, and instructs printing by selecting a print job stored in the printing apparatus, and as a result, the print job is finally executed, and a printed item desired by the user can be obtained.

Furthermore, there is also a printing apparatus in which this storing printing function is combined with a user authentication function, and a user who has submitted a print job needs to undergo user authentication performed in the printing apparatus in order for the user to be able to instruct the execution of the print job. In such a printing apparatus including the storing printing function accompanied by user authentication, user information included in the print job is registered as user authentication information in the printing apparatus, as described in Japanese Patent No. 5494315, for example.

Also, a printing apparatus in which user authentication is performed using an external user authentication system is one type of the above-described printing apparatus including the storing printing function accompanied by user authentication. When user authentication information described in Japanese Patent No. 5494315, for example, is registered in such a printing apparatus, if the user information included in a print job includes character information that is not supported by the user authentication system, the user information cannot be registered as the user authentication information. In order to deal with such a problem, a procedure is conceivable in which, if the user information included in a print job includes character information that is not supported by the user authentication system, the character information is changed to character information that is supported by the user authentication system, and the changed user information is registered. However, by doing this, there is a risk that the changed user information including the changed character information will be the same as another piece of user information that has been registered.

SUMMARY OF THE INVENTION

An aspect of the present invention is to eliminate the above-mentioned problem with conventional technology.

A feature of the present invention is to provide a technique of, even if user information included in a print job includes character information that is not supported by a user authentication function, registering the user information by replacing unsupported character information with supported character information without duplicating the registered user information.

According to a first aspect of the present invention, there is provided a printing apparatus comprising: a memory device that stores a set of instructions; and at least one processor that executes the instructions to function as: an obtaining unit that obtains first user information included in a received print job; a determination unit that determines whether or not the first user information includes first character information that is not supported by a user authentication function; a conversion unit that converts the first user information to second user information in which the first character information that the determination unit has determined to be not supported by the user authentication function is changed to second character information supported by the user authentication function; and a control unit that, if the second user information obtained by conversion performed by the conversion unit does not match user information managed by the user authentication function, registers the first user information and the second user information to the user authentication function in association with each other, and if the second user information matches user information managed by the user authentication function, registers, to the user authentication function, the first user information and third user information that are information based on the first user information and are different from the second user information, in association with each other.

According to a second aspect of the present invention, there is provided a method of controlling a printing apparatus comprising: obtaining first user information included in a received print job; determining whether or not the first user information includes first character information that is not supported by a user authentication function; converting the first user information to second user information in which the first character information that the determination unit has determined to be not supported by the user authentication function is changed to second character information supported by the user authentication function; and performing control to, if the second user information does not match user information managed by the user authentication function, register the first user information and the second user information to the user authentication function in association with each other, and if the second user information matches user information managed by the user authentication function, register, to the user authentication function, the first user information and third user information that are information based on the first user information and are different from the second user information, in association with each other.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 depicts a view illustrating a configuration of a print system according to an embodiment.

FIG. 2 is a block diagram for describing a hardware configuration of an information processing apparatus according to the embodiment.

FIG. 7 is a diagram illustrating an example of user information managed by a user information management module of a user authentication apparatus according to the embodiment.

FIG. 8 depicts a view illustrating an example of a user list that the image forming apparatus displays in a display unit in step S603 in FIG. 6.

FIG. 9 depicts a view illustrating an example of a print job list managed by a print job management module of the image forming apparatus according to the embodiment.

FIG. 12 is a sequence diagram for describing processing of registering, when the image forming apparatus according to the embodiment receives a print job from the information processing apparatus, job owner information included in the print job to the user authentication apparatus as user authentication information.

FIG. 13 is a flowchart for describing registration processing, in detail, of a user ID in step S1210 in FIG. 12 performed by the image forming apparatus according to the embodiment.

DESCRIPTION OF THE EMBODIMENTS

Figure 3:
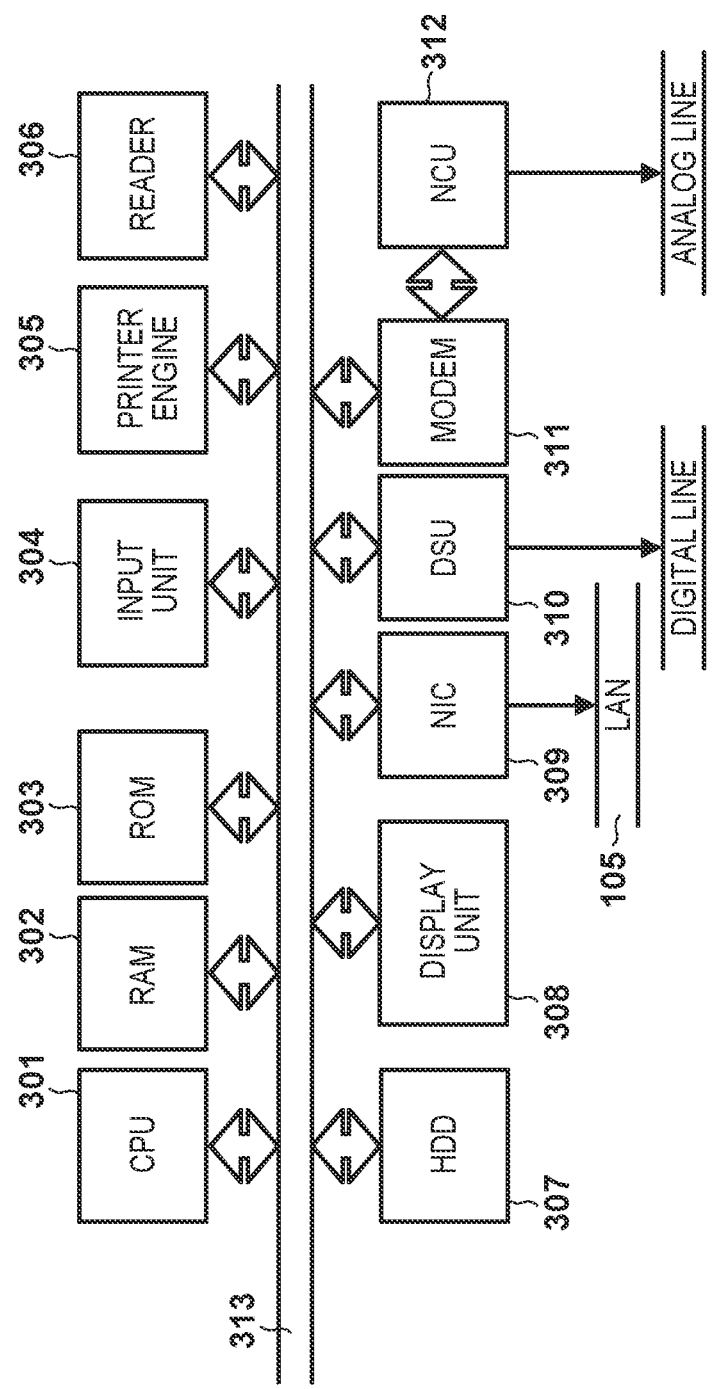
FIG. 3 is a block diagram for describing a hardware configuration of an image forming apparatus according to the embodiment.

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

In the present embodiment, a description will be given using an example in which an image forming apparatus registers, to a user authentication apparatus, job owner information included in a print job received from an external apparatus such as an information processing terminal. Specifically, registration processing in the case where the job owner information included in a print job includes character information that is not supported by the user authentication apparatus will be described as an example.

FIG. 1 depicts a view illustrating a configuration of a print system according to the embodiment.

An image forming apparatus 101 is an image forming apparatus, such as a multi-function peripheral, for example, that can print out by executing a print job received from an information processing apparatus 103 via a network 105. A user authentication apparatus 102 is connected to the image forming apparatus 101 via the network 105, and performs authentication of a user using the image forming apparatus 101, while referencing a user DB 104.

FIG. 2 is a block diagram for describing a hardware configuration of the information processing apparatus 103 according to the embodiment. Note that the configuration of the information processing apparatus 103 is basically the same as the user authentication apparatus 102 excluding the fact that the user authentication apparatus 102 includes the user DB 104, and therefore the description of the configuration of the user authentication apparatus 102 will be omitted.

A CPU 201 controls operations of the information processing apparatus 103 by executing a boot program stored in a ROM 203 and deploying an OS and a program stored in an HDD 205 to a RAM 202, and executing the deployed program. The RAM 202 provides a work area for the CPU 201, and temporarily stores various types of data. The ROM 203 stores the above-described boot program, various types of device setting information, and the like. The HDD 205 is a hard disk drive which is an auxiliary storage device for storing a control program, the OS, and the like. An input unit 204 includes a keyboard, a pointing device, and the like, and transmits, upon receiving a user operation, the user operation to the CPU 201 via a bus 208. A display unit 206 displays a menu screen, a message to a user, and the like, according to an instruction from the CPU 201. An NIC 207 is a network interface card (NIC) for exchanging data with another network device via the network 105.

FIG. 3 is a block diagram for describing a hardware configuration of the image forming apparatus 101 according to the embodiment.

A CPU 301 controls the image forming apparatus 101. The CPU 301 controls operations of the image forming apparatus 101 by executing a boot program stored in a ROM 303 and deploying an OS and a program stored in an HDD 307 to a RAM 302, and executing the deployed program. The RAM 302 provides a work area for the CPU 301, and temporarily stores various types of data. The ROM 303 stores the above-described boot program, various types of device setting information, and the like. The HDD 307 is a hard disk drive which is an auxiliary storage device for storing a control program, the OS, and the like, and furthermore for storing a received print job and the like. An input unit 304 accepts the designation of a print job desired by a user and the like in response to an operation made by a user. A printer engine 305 prints an image on paper (sheet) according to image data. The printer engine 305 makes the states of a sheet feeding option (such as a sheet feeding cassette) and a sheet discharge option (such as a finisher apparatus) related to the print processing identifiable. A reader 306 reads a document placed on a platen and generates image data in binary values representing black and white or in multi values for representing colors. A display unit 308 includes a display apparatus such as a touch panel, and is used to display the state of the image forming apparatus 101, an error message, and the like. Note that the display unit 308 may be integrated with the input unit 304. An NIC 309 bidirectionally exchanges data with another network device via the network (LAN) 105. A DSU 310 is a DSU (Digital Service Unit) that is connected to a digital line, and is used for transmitting/receiving data. An NCU 312 is an NCU (Network Control Unit) that is to be connected to an analog line for performing opening/closing of the line, sending/receiving control, transmitting/receiving image data (analog), and the like. A modem 311 modulates/demodulates transmission and reception data. The above-described units are connected to each other via a bus 313.

Figure 4:
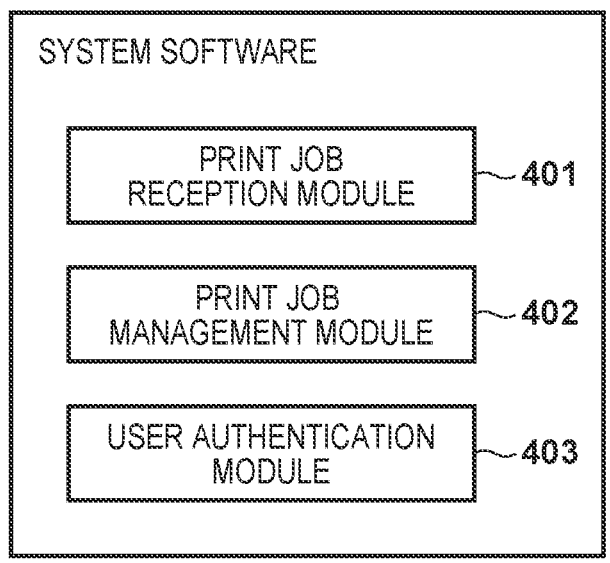
FIG. 4 is a functional block diagram for describing functional modules included in a control program of the image forming apparatus according to the embodiment.

FIG. 4 is a functional block diagram for describing functional modules included in a control program of the image forming apparatus 101 according to the embodiment. The functions indicated by functional modules 401 to 403 shown in FIG. 4 are realized by the CPU 301 deploying respective programs to the RAM 302 from the HDD 307 and executing the deployed programs.

A print job reception module 401 receives a print job from the information processing apparatus 103 via the NIC 309, and sends the print job to a print job management module 402. The print job management module 402 analyzes a print job submitted by the information processing apparatus 103, and uses the printer engine 305 to print out by executing a print job stored in the HDD 307. A user authentication module 403 performs user authentication in order to specify the user of the image forming apparatus 101. Note that user authentication information can be input by a user via the input unit 304.

Figure 5:
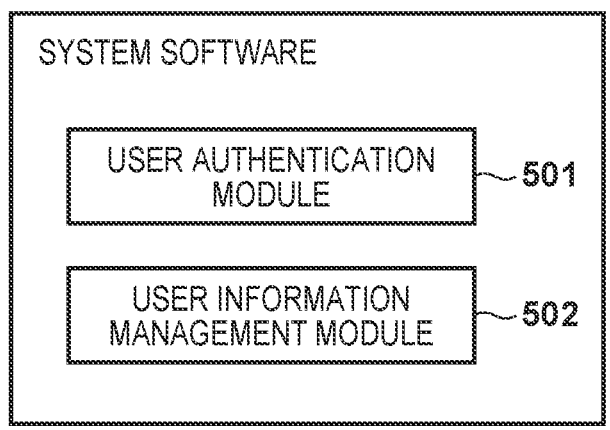
FIG. 5 is a functional block diagram for describing functional modules included in a control program of a user authentication apparatus according to the embodiment.

FIG. 5 is a functional block diagram for describing functional modules included in a control program of the user authentication apparatus 102 according to the embodiment. The functions indicated by functional modules 501 and 502 shown in FIG. 5 are realized by the CPU 301 of the user authentication apparatus 102 deploying respective programs to the RAM 302 from the HDD 307 and executing the deployed programs.

A user authentication module 501, upon receiving a user authentication request along with user information from the image forming apparatus 101, performs user authentication processing based on the user information. A user information management module 502 manages the user information in order for the user authentication module 501 to perform user authentication.

Figure 6:
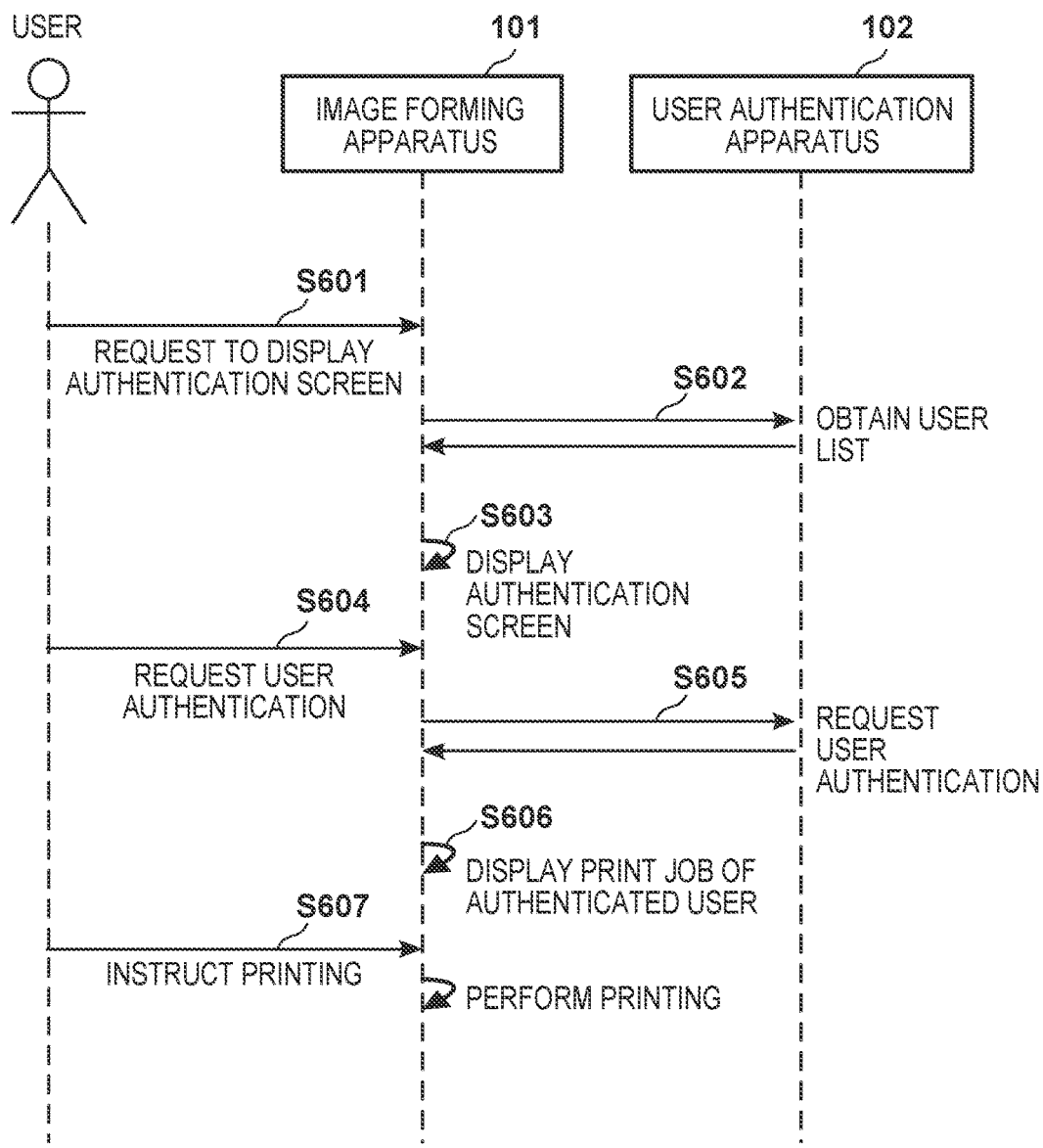
FIG. 6 is a diagram for describing a processing sequence when a user performs printing by executing a print job stored in an HDD of the image forming apparatus, in the image forming apparatus according to the embodiment.

FIG. 6 is a diagram for describing a processing sequence when a user initiates printing by executing a print job stored in the HDD 307 of the image forming apparatus 101, in the image forming apparatus 101 according to the embodiment.

First, in step S601, the user inputs a request to display an authentication screen via the input unit 304 of the image forming apparatus 101. With this, in step S602, the user authentication module 403 of the image forming apparatus 101 obtains a user list from the user authentication module 501 of the user authentication apparatus 102. Then, in step S603, the image forming apparatus 101 displays a user list such as that shown in FIG. 8, for example, on the display unit 308. In the embodiment, a request to authenticate the user is issued to the image forming apparatus 101 in step S604 as a result of the user pressing his/her user button on the user list. Upon receiving input of the authentication request from the user, the user authentication module 403 of the image forming apparatus 101 requests the user authentication module 501 of the user authentication apparatus 102 to perform authentication of the user in step S605.

If authentication is successful, in step S606, the print job management module 402 of the image forming apparatus 101 displays a list of the print jobs that the user has registered, on the display unit 308. Then, in step S607, the user selects a desired print job from the displayed print job list, and makes an instruction to print out by executing the print job. With this, the print job management module 402 of the image forming apparatus 101 performs printing by executing the selected print job using the printer engine 305.

FIG. 7 is a diagram illustrating an example of the user information managed by the user information management module 502 of the user authentication apparatus 102 according to the embodiment.

The user information includes information regarding a user ID 701 and a job owner name 702. The user authentication module 501 of the user authentication apparatus 102 is assumed to handle, in step S602, the user information managed by the user information management module 502 as the user list.

FIG. 7 shows an example in which two users having respective pieces of job owner information each including an unsupported character (¥, @) that is not supported by the user authentication apparatus 102 are registered by respective user IDs that are different to each other.

FIG. 8 depicts a view illustrating an example of the user list that the image forming apparatus 101 displays on the display unit 308 in step S603 in FIG. 6. In FIG. 8, two user buttons respectively including the user IDs ("Sato_abc" and "Sato_abc_2") of the two users shown in FIG. 7 are displayed.

In the embodiment, it is assumed that, as a result of a user pressing his/her user button in the user list, the user can log into the image forming apparatus 101 as the user corresponding to the pressed user button. Note that the present invention is also applied to a case of a system in which a personal identification number needs to be input when the user authentication is performed. Also, the user authentication module 403 of the image forming apparatus 101 is assumed to be able to identify, in a state in which a user has logged into the image forming apparatus 101, the user ID of the login user at any timing.

FIG. 9 depicts a view illustrating an example of the print job list managed by the print job management module 402 of the image forming apparatus 101.

This print job list shows a list of print jobs stored in the HDD 307, and includes print job reception time and date 901, a user ID 902, a print job name 903, and a storage location 904 in the HDD 307. The print job list that the print job management module 402 displays in the display unit 308 in step S606 displays the print jobs managed by this print job list. The print list shown in FIG. 9 shows a list of print jobs that two users respectively having user IDs that are different to each other (whose job owner names are respectively "Sato¥abc" and "Sato@abc") have stored.

Figures 10, 11:
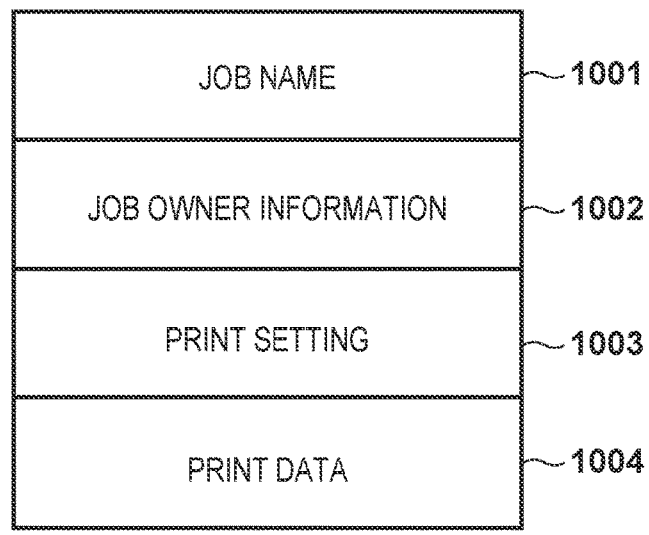
FIG. 10 is a diagram for describing a data structure of a print job that the image forming apparatus according to the embodiment receives from the information processing apparatus.
FIG. 11 depicts a view illustrating an example of a print job list, of an authenticated user, that the print job management module of the image forming apparatus displays in the display unit in step S606 in FIG. 6.

FIG. 10 is a diagram for describing a data structure of the print job that the image forming apparatus 101 according to the embodiment receives from the information processing apparatus 103.

In the embodiment, the print job includes a job name 1001, job owner information 1002, a print setting 1003, and print data 1004. The job name 1001 is the name of a job to be displayed in the print job list. The job owner information 1002 is information for specifying the user who has submitted the print job. The print setting 1003 is the job setting when the print job is to be executed and printing is performed, and includes a color attribute, a single/double side attribute, a staple attribute, and the like, for example. The print data 1004 is the image data to be printed.

The print job management module 402 of the image forming apparatus 101, upon receiving a print job having such a data structure, stores the print job in the RAM 302 or the HDD 307. Also, the print job management module 402 can refer/control these pieces of information based on an instruction made by an authenticated user.

FIG. 11 depicts a view illustrating an example of the print job list, of an authenticated user (here, whose job owner name is "Sato¥abc"), that the print job management module 402 of the image forming apparatus 101 according to the embodiment displays on the display unit 308 in step S606 in FIG. 6.

As a result of the user selecting a desired print job and pressing a print button 1100 in the print job list, the user can instruct the image forming apparatus 101 to perform printing of the selected print job.

FIG. 12 is a sequence diagram for describing processing for registering, when the image forming apparatus 101 according to the embodiment receives a print job from the information processing apparatus 103, the job owner information 1002 included in the print job to the user authentication apparatus 102 as user authentication information.

First, in step S1201, the user instructs the image forming apparatus 101 to perform printing from the information processing apparatus 103. With this, in step S1202, the information processing apparatus 103 transmits, according to the print instruction from the user, the designated print job to the image forming apparatus 101. In step S1203, the image forming apparatus 101, upon receiving the print job from the information processing apparatus 103, extracts the job owner information 1002 from the print job. Then, in step S1204, the image forming apparatus 101 registers the extracted job owner information 1002 to the user authentication apparatus 102 as the user ID. Then, in step S1205, the print job management module 402 of the image forming apparatus 101 stores the received print job in the HDD 307, updates the print job list, and ends this processing.

FIG. 13 is a flowchart for describing the registration processing, in detail, of the user ID in step S1210 in FIG. 12 performed by the image forming apparatus 101 according to the embodiment.

First, in step S1301, the CPU 301 functions as the print job reception module 401. The CPU 301, upon receiving, in step S1301, a print job transmitted from the information processing apparatus 103, extracts the job owner information 1002 from the print job, in step S1302. Next, the processing advances to step S1303, the CPU 301 functions as the user authentication module 403, and obtains unsupported character information regarding characters that are not supported as the user ID from the user authentication module 501 of the user authentication apparatus 102. Next, the processing advances to step S1304, and the CPU 301 functions as the user authentication module 403, and determines whether or not the job owner information 1002 extracted in step S1302 includes the unsupported character information obtained in step S1303. Here, if the job owner information 1002 is determined to include unsupported character information, the CPU 301 advances the processing to step S1305. In step S1305, the CPU 301 generates replaced job owner information in which the unsupported character information included in the job owner information 1002 has been replaced with another piece of supported character information, and advances the processing to step S1306. On the other hand, if it is determined, in step S1304, that the job owner information 1002 extracted in step S1302 does not include unsupported character information, the processing advances to step S1306.

In step S1306, the CPU 301 functions as the user authentication module 403, and determines whether or not the job owner information 1002 extracted in step S1302 or the replaced job owner information is registered in the user DB 104 of the user authentication apparatus 102. That is, it is determined whether or not the job owner information matches one of the user IDs 701 of the user information in FIG. 7. Here, if it is determined that the job owner information is registered as the user ID 701, the processing advances to step S1307, and the CPU 301 determines whether or not the job owner information obtained in step S1302 is registered as the job owner name 702 of the user information. Here, if it is determined that the job owner information is registered as the job owner name 702, because information regarding the user is already registered in the user DB 104, the processing is ended without newly registering the user.

On the other hand, if it is determined that, in step S1307, the job owner information obtained in step S1302 is not registered as the job owner name 702 of the user information, the processing advances to step S1305, and job owner information in which the replaced job owner information has been further changed is created. Here, job owner information in which "_(number)" is appended to the end of the previous job owner information is created, for example, and the processing advances to step S1306.

Then, in step S1306, if it is determined that the job owner information is not registered as the user ID, the processing advances to step S1308, the CPU 301 functions as the user authentication module 403, and the job owner information is registered as the user ID 701 of the user information. Furthermore, the original job owner information obtained in step S1302 is registered as the job owner name 702, and this processing is ended.

A specific example will be described with reference to FIG. 7. It is assumed that the job owner information 1002 of the print job obtained in step S1302 is "Sato¥abc", for example. This user information includes an unsupported character "¥". Therefore, in step S1305, this unsupported character "¥" is replaced with "_", and replaced job owner information "Sato_abc" is obtained. Then, in step S1306, if it is determined that this job owner information "Sato_abc" is not registered in the user ID 701, the processing advances to step S1308. In step S1308, the replaced job owner information "Sato_abc" and the original job owner information "Sato¥abc" are respectively registered to the user ID 701 and the job owner name 702 in association with each other. The result is indicated by the reference numeral 703 in FIG. 7.

Next, if the job owner information 1002 of the print job obtained in step S1302 is assumed to be "Sato@abc", this user information includes an unsupported character "@", for example. Therefore, in step S1305, this unsupported character "@" is replaced with "_", and replaced job owner information "Sato_abc" is obtained. Here, because, the job owner information "Sato_abc" is registered in the user ID 701 indicated by the reference numeral 703, the processing advances to step S1307, and it is determined whether or not the original job owner information "Sato@abc" is registered in the job owner name 702. In this case, because "Sato@abc" is not registered in the job owner name 702, the processing advances to step S1305, and "Sato_abc" is changed to ""Sato_abc_2". With this, it is determined that, in step S1306, this job owner information "Sato_abc_2" is not registered in the user ID 701, and the processing advances to step S1308. In step S1308, the replaced job owner information "Sato_abc_2" and the original job owner information "Sato@abc" are respectively registered to the user ID 701 and the job owner name 702 in association with each other. The result is indicated by the reference numeral 704 in FIG. 7.

Note that a mode is also conceivable in which the authentication screen display in step S603 displays the user list as a list, and the user authentication request in step S604 is to select a specific user from the user list displayed as a list. In such a user authentication function, the job owner name 702 instead of the user ID 701 may be displayed in the user list to be displayed in the authentication screen. Displaying the job owner name 702 in the authentication screen has an advantage in that the user can easily specify the user on their own.

According to the embodiment described above, even in a case where the user information included in a print job includes character information that is not supported by the user authentication, user information obtained by replacing the unsupported character information with supported character information can be registered without duplicating the registered user information.

Note that, in the embodiment, the image forming apparatus 101 and the user authentication apparatus 102 have been described as separate apparatuses, but the present invention can be applied to the case where the image forming apparatus 101 and the user authentication apparatus 102 are integrated into one apparatus. In this case, the user information management module 502 in FIG. 5 is installed in the software of the image forming apparatus 101.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-86545, filed Apr. 25, 2017, which is hereby incorporated by reference herein in its entirety.

What is claimed is:

1. A printing apparatus comprising:
a memory device that stores a set of instructions; and
at least one processor that executes the instructions to function as:
an obtaining unit that obtains first user information included in a received print job;
a determination unit that determines whether or not the first user information includes first character information that is not supported by a user authentication function;
a conversion unit that converts the first user information to second user information when the first character information that the determination unit has determined to be not supported by the user authentication function is changed to second character information supported by the user authentication function; and
a control unit that, if the second user information obtained by conversion performed by the conversion unit does not match user information managed by the user authentication function, registers the first user information and the second user information to the user authentication function in association with each other, and
if the second user information matches user information managed by the user authentication function, registers, to the user authentication function, the first user information and third user information that are information based on the first user information and are different from the second user information, in association with each other.

2. The printing apparatus according to claim 1, wherein, in a case that the determination unit determines that the first user information does not include first character information that is not supported by the user authentication function, the control unit, if the user authentication function does not include user information associated with the first user information, performs control such that the first user information is registered to the user authentication function.

3. The printing apparatus according to claim 1, wherein the user authentication function is provided by a user authentication unit included in the printing apparatus.

4. The printing apparatus according to claim 1, wherein the user authentication function is provided by a user authentication apparatus that is connected to the printing apparatus via a network.

5. The printing apparatus according to claim 1,
wherein the printing apparatus includes a storing printing function, and
a user authenticated by the user authentication function can cause a print job stored in the printing apparatus to be executed, using the storing printing function.

6. The printing apparatus according to claim 1, wherein the determination unit obtains character information that is not supported by the user authentication function from the user authentication function, and determines whether or not the first user information includes the first character information that is not supported by the user authentication function based on the obtained character information.

7. The printing apparatus according to claim 1, wherein the control unit, furthermore, if the user authentication function includes user information associated with the first user information, does not register the first user information included in the received print job.

8. A method of controlling a printing apparatus comprising:
obtaining first user information included in a received print job;
determining whether or not the first user information includes first character information that is not supported by a user authentication function;
converting the first user information to second user information when the first character information, which is determined to be not supported by the user authentication function is changed to second character information supported by the user authentication function; and performing control to, if the second user information does not match user information managed by the user authentication function, register the first user information and the second user information to the user authentication function in association with each other, and if the second user information matches user information managed by the user authentication function, register, to the user authentication function, the first user information and third user information that are information based on the first user information and are different from the second user information, in association with each other.

9. A non-transitory computer readable storage medium storing a program for causing a processor to execute a method of controlling a printing apparatus, the method comprising:

obtaining first user information included in a received print job;

determining whether or not the first user information includes first character information that is not supported by a user authentication function;

converting the first user information to second user information when the first character information, which is determined to be not supported by the user authentication function is changed to second character information supported by the user authentication function; and performing control to, if the second user information does not match user information managed by the user authentication function, register the first user information and the second user information to the user authentication function in association with each other, and if the second user information matches user information managed by the user authentication function, register, to the user authentication function, the first user information and third user information that are information based on the first user information and are different from the second user information, association with each other.

* * * * *